(12) United States Patent
Spaulding et al.

(10) Patent No.: US 7,836,569 B2
(45) Date of Patent: Nov. 23, 2010

(54) TIRE PRESSURE MONITOR INSTALLATION TOOL

(75) Inventors: James R. Spaulding, Macomb, MI (US); Marcus P. Beckman, Garden City, MI (US); Bruce R. Koch, Goodrich, MI (US); James Hytinen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 458 days.

(21) Appl. No.: 11/621,137

(22) Filed: Jan. 9, 2007

(65) Prior Publication Data

US 2008/0163471 A1    Jul. 10, 2008

(51) Int. Cl.
*B23P 19/04* (2006.01)

(52) U.S. Cl. .............. 29/249; 29/244; 29/267; 29/33 N

(58) Field of Classification Search .......... 29/244, 29/249, 267, 33 N
See application file for complete search history.

(56) References Cited

U.S. PATENT DOCUMENTS

| | | | | |
|---|---|---|---|---|
| 2,308,413 A * | 1/1943 | Berkman | .................... | 29/214 |
| 2,940,167 A * | 6/1960 | Boyer et al. | ................ | 29/221.5 |
| 2,947,073 A * | 8/1960 | Boyer | .................... | 29/221.5 |
| 3,088,199 A * | 5/1963 | Lewis | .................... | 29/221.5 |
| 4,528,735 A * | 7/1985 | Eastridge et al. | ............ | 29/221.5 |
| 5,355,552 A * | 10/1994 | Huang | .................... | 16/421 |
| 6,202,510 B1 * | 3/2001 | Kupelian | .................... | 81/15.7 |

* cited by examiner

*Primary Examiner*—Joseph J Hail, III
*Assistant Examiner*—Shantese L McDonald

(57) ABSTRACT

A tire pressure monitor (TPM) installation tool adapted for use by a operator, and for installing a push-in style TPM within a valve stem opening defined by a wheel, wherein the tool is configured to provide mechanical advantage while assembling the TPM and wheel, and includes an elongated member configured to receive an applied force from the operator, a nesting fixture configured to retain the TPM in a relatively fixed position, and a wheel engaging member for securing the tool during installation.

10 Claims, 3 Drawing Sheets

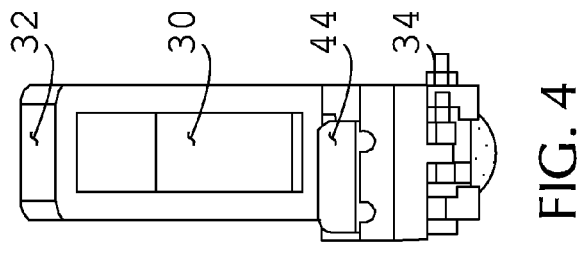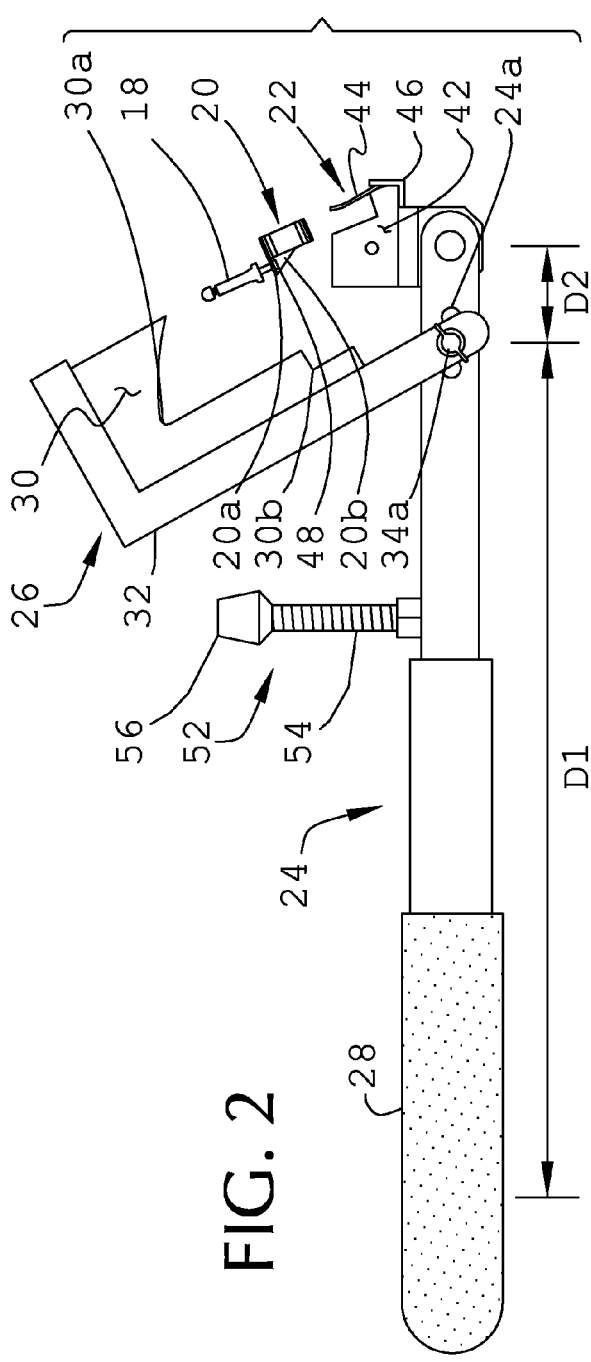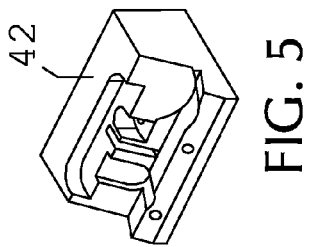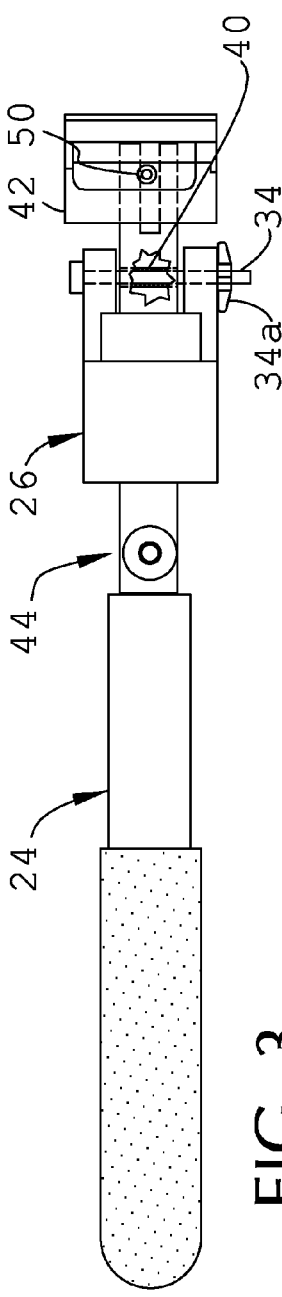

TIRE PRESSURE MONITOR INSTALLATION TOOL

TECHNICAL FIELD

The present invention relates to tools for and methods of installing a tire pressure monitor (TPM) in a fixed position within a wheel, and more particularly, to a tire pressure monitor installation tool configured to provide mechanical advantage and facilitate the manual assembly of the TPM and wheel.

BACKGROUND OF THE INVENTION

Tire pressure monitors have been developed to monitor the inflated tire pressure of a wheel, in order to insure sufficient pressure for proper vehicular operation. Prior to their implementation, operators relied solely upon observations and experience to determine a potential low-pressure tire. Once an observation was made, a tire pressure gauge was then utilized to measure the actual pressure of the tire. Today, observation is still utilized, where a TPM is not present. All of these methods are utilized to help decrease the likelihood of mishaps caused by low-pressure tires. For example, operating a vehicle having a low pressure tire may result in unequal wear amongst the tire treads, the misalignment of the steering system, a low riding tire that compromises the structural integrity of the tire.

TPMs are effective in preventing these concerns by constantly monitoring the tire pressure, and alerting the operator when the pressure falls outside of a predetermined limit (e.g., 168 to 272 kPa). By doing so, TPMs ensure that proper tire inflation is provided, thereby increasing operator confidence, improving the driving experience, and increasing the life of the tire. Conventional methods of implementing TPMs in the manufacturing process, however, have increased the cost of manufacture. A more conventional type of push-in TPM has been developed to help reduce this cost by replacing a fastener, such as a retaining nut, and the need for a drive mechanism to secure the nut, with a compressible valve stem configured to be lodged into a stem opening defined by the wheel.

Push-in style TPMs, however, also present installation concerns. The intricate tasks of securing the wheel and TPM, wherein the TPM typically includes a circuitry housing connected to the stem, and driving the stem into the opening increase the complexity and cost of automation, making manual installation necessary. The manual installation of a push-in style TPM requires the application of a large force to the housing, and the sensitive circuitry housed therein, in order to drive the stem. The force must be such that a portion of the stem larger than the opening becomes compressed and lodged against the wheel, so as to retainably fix the TPM to the wheel. Because the housing is not configured to sustain such a force, it is appreciated by those in the art that many TPMs become damaged, or destroyed during this process.

SUMMARY OF THE INVENTION

Responsive to these and other concerns the present invention presents a tool for and method of installing a push-in style TPM. The tool is useful, among other things, for providing mechanical advantage, so that the necessary applied force by an operator is significantly decreased. The tool is also useful for reducing the likelihood of damage to the TPM by transferring the force to the TPM through a fastener that connects the housing and stem.

In a preferred embodiment of the invention, the TPM installation tool is adapted for use by an operator, and with a wheel and a TPM having a valve stem, and a circuitry housing connected to a distal end of the stem. The tool is configured to install the TPM within a hole defined by the wheel, so as to assemble the TPM and wheel, and provide mechanical advantage while doing so. The novel tool includes an elongated member presenting first and second distal ends, a manual grip section adjacent the first distal end, and a nesting fixture connected to the second end. The tool also includes a wheel-engaging member coupled to the elongated member, and configured to secure at least a portion of the tool to the wheel during installation. Finally, the tool includes a mechanical advantage element configured to receive an applied force from the operator, multiply the applied force by a factor to generate a resultant force, and transmit the resultant force to the TPM, during installation.

Thus, it will be appreciated and understood that the present invention provides a number of improvements and advantages over the prior art, including providing a more ergonomic process that decreases exposure to injury. Because of the simplicity of the tool, equipment maintenance is eliminated, significant cost reduction of original tool process time has improved (i.e., faster cycle time), and man-hours spent training the operator is significantly reduced.

The aforementioned aspects, features, and/or species of the present invention are discussed in greater detail in the section below titled DESCRIPTION OF THE PREFERRED EMBODIMENT(S).

BRIEF DESCRIPTION OF THE DRAWINGS

Preferred embodiments of the invention are described in detail below with reference to the attached drawing figures, wherein:

FIG. 2 is an elevation view of a preferred embodiment of the tool, in accordance with a preferred embodiment of the invention, and an exemplary push-in style TPM;

FIG. 3 is a top view of the tool and TPM shown in FIG. 2;

FIG. 4 is a front view of the tool and TPM shown in FIGS. 2 and 3; and

FIG. 5 is a perspective view of the fixed element of the nesting fixture of the tool, in accordance with a preferred embodiment of the invention.

DESCRIPTION OF THE PREFERRED EMBODIMENT(S)

Figure 1:
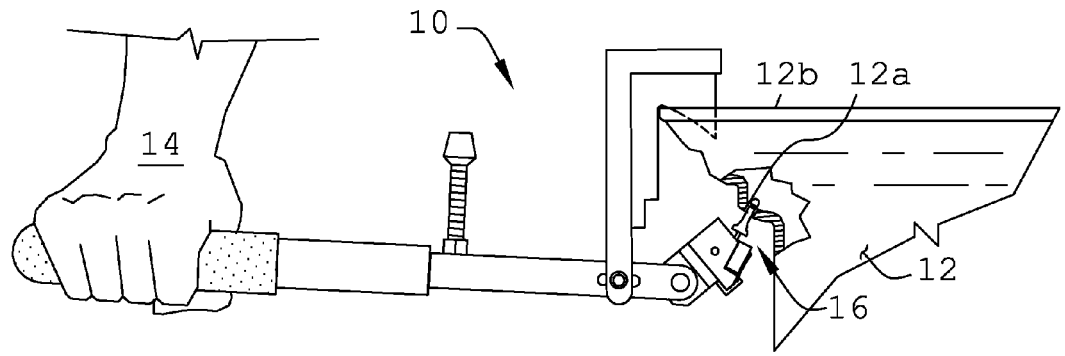
FIG. 1 is an elevation view of a tool adapted to aid the assembly of a wheel and TPM by an operator, in accordance with a preferred embodiment of the present invention, particularly showing the tool in an initial non-inserted position.

As shown in FIGS. 1 through 2, the present invention concerns a hand held Tire Pressure Monitor (TPM) and Rubber Stem installation tool 10 adapted for use with a car or truck wheel 12, and by an operator of the tool or laborer 14. The inventive tool 10 is configured for use with a push-in style TPM 16 that includes a compressible valve stem 18, and a circuitry housing 20 connected to the stem 18 (see, FIG. 2). The housing 20 typically encloses sensitive circuitry, a receiver/transceiver, and a power source, such as a lithium battery, necessary for its proper function. The TPM 16 is described as a "push-in" style, because the stem 18 is forced into a stem opening 12a defined by the wheel 12, during assembly. The opening may be lined by a grommet (not shown), so as to seal the assembly.

Figure 1A:
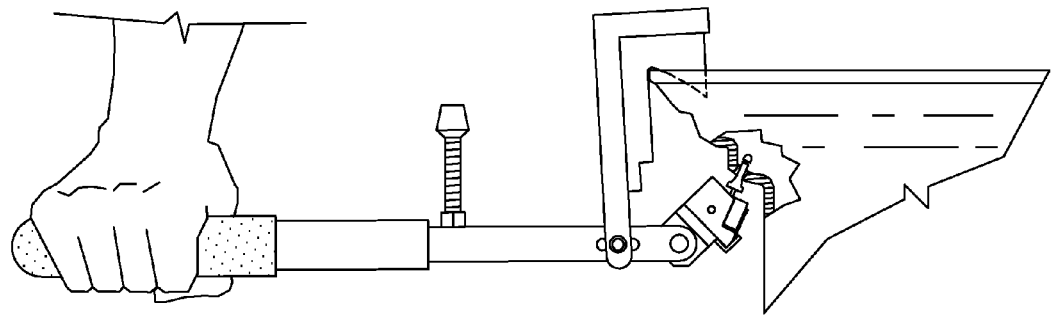
FIG. 1a is an elevation view of the tool, operator, TPM, and wheel shown in FIG. 1, particularly illustrating the tool and TPM in an intermediate position.
Figure 1B:
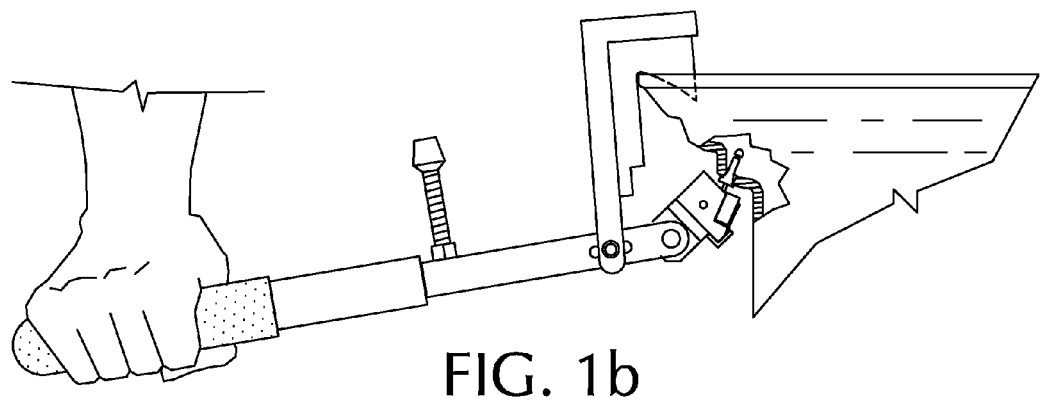
FIG. 1b is an elevation view of the tool, operator, TPM, and wheel shown in FIGS. 1 and 1a, particularly illustrating the tool and TPM in the fully inserted position.

FIGS. 1, 1a, and 1b illustrate the operation of the tool 10, wherein the operator 14 first positions the TPM 16 into a nesting fixture 22 on the tool 10, engages the tool 10 and wheel 12 near the valve stem opening 12a, and by applying pressure to the handle of the tool forces the TPM 16 into place. It is appreciated by those of ordinary skill in the art that the inventive tool 10 and method meets all ergonomic requirements for hand forces and improves throughput in comparison to prior art methods, which is significant given that a factory production rate of 2000 manual TPM/wheel assemblies in eight hours is typical. More specifically, it is appreciated that the tool 10 provides actual mechanical advantage, such that a minimal force (e.g., not to exceed 124 kPa (i.e., 18 psi)) applied by the operator 14 results in sufficient force to drive the TPM 16 and complete the assembly.

In the illustrated embodiment, the structural configuration of the tool 10 provides the mechanical advantage, and presents a traditional lever-arm. More particularly, the preferred tool 10 includes an elongated member 24, and a wheel-engaging member 26 adjustably connected to the elongated member 24 (compare, FIGS. 1, 1a, and 1b). As best shown in FIGS. 2 and 3, the elongated member 24 preferably presents a tubular configuration approximately 38 cm (15 in.) in length, and consists of material having sufficient bending strength to sustain the applied and resultant forces. Suitable materials include aluminum, a high strength thermoplastic, or steel, with a lighter weight material, such as aluminum or plastic, being preferred.

The elongated member 24 presents first and second ends, and a manual grip section 28 adjacent the first end. The preferred grip section 28 presents a compressible layer that overlays a distal portion of the elongated member 24 not less than 15 cm in length, so as to be comfortably griped by either hand of the operator 14 (see FIGS. 1, 1a, and 1b), and more preferably not less than 20 cm to better accommodate a two-handed application of force. A suitable material, such as polyurethane or soft rubber, may be used to form the layer.

The preferred wheel-engaging member 26 presents an "L"-shaped structure that is approximately 12.5 cm (5 in.) in length on its longest leg, and configured to secure the tool 10 to the wheel 12. More particularly, and as shown in FIGS. 1, 1a, and 1b, the wheel engaging member 26 is configured to receive the rim 12b of the wheel 12 near the opening 12a, and cooperatively apply the resultant force during installation of the TPM 16 by clamping the wheel in place. More preferably, wherein the wheel 12 is formed of material having a first hardness value, the wheel engaging member 26 presents an interior wheel engaging surface formed of a material having a hardness less than that of the wheel 12, so as to reduce the likelihood of damage.

As best shown in FIGS. 2 and 4, the preferred wheel-engaging member 26 consists essentially of an interior wheel engaging hook member 30, and superjacent back support member 32 fixedly connected to the hook member 30. The hook member 30 presents the softer wheel-engaging surface, and to further reduce the likelihood of abrasion or scarring, the preferred hook member 30 further presents chamfered or filleted edges. The hook member 30 also presents an acute bend 30a configured to better receive and retain the rim 12b of the wheel by allowing a greater degree of operational rotation during installation (see FIGS. 1, 1a and 1b). The hook member 30 is also configured to engage the nesting fixture 22 when rotating towards the second end of the elongated member, and as such presents a nesting notch 30b.

In the illustrated embodiment, the wheel-engaging and elongated member 24,26 define concentrically alignable holes, so as to enable a pivot connection. The wheel-engaging member 26 further defines a distal notch coaxial with the wheel engaging member holes, and configured to receive at least a portion of the elongated member 24 when the holes are aligned (see FIG. 3). Finally, a pin 34 completes the traditional pin connection. The pin 34 is preferably secured by a wing nut 34a to facilitate manual adjustment. More preferably, the elongated member 24 defines a plurality of holes 24a, wherein each are separately alignable with the wheel engaging member holes, so as to present a plurality of pivot points. It is appreciated that such adjustability is vital to enable the use of the tool 10 with varying sizes of wheels. For example, a plurality of three holes 1 cm off center, as shown in FIG. 2, enables the tool 10 to be utilized with wheels 15" to 22" in diameter.

Figure 2A:
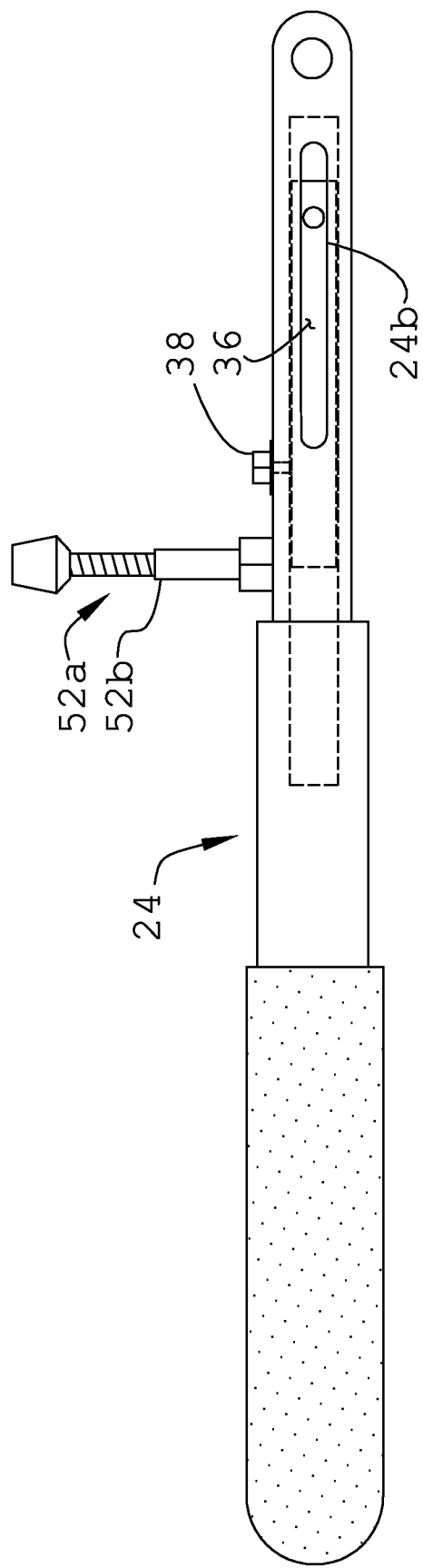
FIG. 2a is an elevation view of a second preferred embodiment of the elongated member of the tool, particularly illustrating a continuous slot, an interior sliding member, a holding screw, and modified stop.

As alternatively shown in FIG. 2a, the elongated member 24 may further include a sliding interior member 36 that defines the hole, and may define a continuous slot 24b, so as to provide greater adjustability. In this configuration a holding screw 38 is configured to engage the interior member 36, once a desired pivot point is selected.

As previously mentioned, the tool 10 includes a mechanical advantage element configured to receive an applied force from the operator, multiply the applied force by a factor to generate a resultant force, and transmit the resultant force to the TPM 16 during installation. In the illustrated embodiment, the element is provided by spacing the pivot point from the longitudinal center of the elongated member 24, and where the pivot point results in a first distance between the applied force location, which is typically the longitudinal center of the grip section 28, to the point, $D_1$, and a second distance between the nesting fixture to the point, $D_2$, the factor is equal to $D_1$ divided by $D_2$ (see, FIG. 2). More preferably, a lubricant layer 40 is presented intermediate the pin 34, and elongated member 24, so as to reduce friction there between, and approach ideal mechanical advantage.

It is within the ambit of the invention for other forms of mechanical advantage to be utilized with the tool 10. For example, an incline wedge, or screw could be utilized. In the case of the later, the rotating screw would engage the TPM, so as to cause its linear displacement during assembly or disassembly.

Similar to the wheel engaging member 26, the preferred nesting fixture 22 is pivotally connected to the elongated member 24 at or near the second end, and is free to rotate during installation (compare FIGS. 1, 1a, and 1b), and as such, will not be further described in that respect. It is also appreciated, however, that the adjustability of the fixture 22 further enables the tool 10 to be used with a wider variety of wheels.

The nesting fixture 22 is configured to hold the TPM 16 in a relatively fixed position, and to transfer the resultant force thereto during installation, and as such is preferably formed of steel or a material having similar strength. In the illustrated embodiment, the nesting fixture 22 is configured to clamp the circuitry housing 20 of the TPM 16, and presents a "U"-shaped structure comprising first and second interconnected parts 42,44. The parts 42,44 are cooperatively configured to define an interior space, wherein at least a portion of the housing 20 is received. The first part 42 presents a seat upon which the housing 20 is placed, while the second part 44 presents a thin planar sheet or spring steel blade (see FIG. 4) that is resistively bendable. The parts 42,44 are further cooperatively configured to present a minimum interior space width that is less than the corresponding width of the housing 20 (see FIG. 2), so that the planar sheet 44 bends outwardly when the housing 20 is placed in the space, and produces a biasing force against the housing 20.

Also similar to the wheel engaging member 26, the preferred nesting fixture 22 presents a soft wheel engaging surface having a hardness less than that of the wheel 12. For example, a felt or rubber material may be adhesively attached to, or as shown in FIG. 2, a plastic cover 46 may be bolted to the seat 42.

As shown in FIG. 5, the preferred seat 42 defines a plurality of cut-outs configured to match the three-dimensional profile of the circuitry housing 20 of the standard push-in style TPM 16. As shown in FIGS. 2 and 3, it is appreciated that the housing 20 includes surficial projections along the three-dimensional side, including a connector engaging bracket 20a, and a vertical support flare 20b that supports the bracket 20a. The bracket 20a is configured to receive a valve stem fastener 48 (e.g., a no. 10 torx screw) that connects the valve stem 18 to the housing 20. The preferred seat 42 further includes an engaging prong 50 (see FIG. 3) that is configured to engage the stem fastener 48, when the TPM 16 is slid into the interior space. The prong 50 may be formed by a set screw that is shimmed so that the head of the screw is proud about 1 mm. The preferred TPM 16 and fixture 22 are cooperatively configured such that the prong 50 and fastener 48 are the primary, and more preferably the sole, point of contact and force transfer during installation between the TPM 16 and fixture 22. It is appreciated that the valve stem fastener 48 presents greater compressive, tensile, and bending shear strength, and is therefore more suitable to transfer the load, than the circuitry housing 20.

Finally, the preferred tool 10 further includes a stop 52 securely attached to the elongated or wheel engaging member 24,26, and configured to prevent the pivotal motion of the wheel engaging member 26 towards the first end of the elongated member 24. More preferably, the stop 52 is adjustably connected to one of the members 24,26, so as to present a variable allowed degree of rotation, which enables the use of the tool 10 with a wider variety of wheel configurations. For example, as shown in FIG. 2, the stop 52 includes a bolt 54 that is adjustably attached to the elongated member 24, and a rubber engaging head 56 attached to the distal end of the bolt 54. In the alternative embodiment shown in FIG. 2a, a modified stop 52a is presented, wherein the bolt translates within a tapped boss 52b connected to the elongated member 24, instead of within the member 24 itself.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A tire pressure monitor (TPM) installation tool adapted for use by an operator, with a TPM having a valve stem and a circuitry housing connected to a distal end of the stem, and with a wheel defining a valve stem hole configured to receive a portion of the stem, wherein the tool is configured to install the TPM, so as to assemble the TPM and wheel and provide mechanical advantage, said tool comprising:

an elongated member presenting first and second distal ends and having a manual grip section adjacent the first distal end and a nesting fixture connected to the second end;

a wheel engaging member coupled to the elongated member and configured to secure at least a portion of the tool to the wheel; and a mechanical advantage element configured to receive an applied force from the operator, multiply the applied force by a factor to generate a resultant force, and transmit the resultant force to the TPM during installation, said nesting fixture being adjustably connected to the elongated member, so as to present one of a plurality of tool configurations, and configured to engage the housing and retain the TPM in a fixed position relative to the fixture during installation, said nesting fixture, elongated member, and wheel engaging members being cooperatively configured such that during installation the stem is inserted in the hole by the resultant force, said valve stem and circuitry housing being connected by a fastener, said nesting fixture and TPM being cooperatively configured so as to transmit the resultant force solely through the fastener during assembly.

2. The tool as claimed in claim 1, said wheel presenting an outer perimeter rim, and defining a valve stem hole, wherein the hole is configured to receive a portion of the stem and spaced from the rim, said wheel engaging member presenting a generally "L"-shaped structure configured to receive the rim and apply a downward force thereto during installation, so as to cooperatively clamp the tool to the wheel during installation.

3. The tool as claimed in claim 2, said wheel being formed of material having a first hardness value, said structure including a wheel engaging hook member and superjacent support member fixedly connected to the hook member, said hook member presenting an acute bend configured to receive the rim of the wheel, having chamfered edges, and being formed of a nonabrasive material having a second hardness value less than the first hardness value, so as not to avoid damaging the wheel, during installation.

4. The tool as claimed in claim 1, said wheel being formed of material having a first hardness value, said nesting fixture presenting an external wheel engaging layer formed of a nonabrasive material having a second hardness value less than the first hardness value.

5. The tool as claimed in claim 1, said nesting fixture being pivotally connected to the elongated member at the second end.

6. The tool as claimed in claim 1, said wheel defining a valve stem hole configured to receive a portion of the stem, said nesting fixture being configured to engage the housing and retain the TPM in a fixed position relative thereto, during installation, said nesting fixture, elongated member, and wheel engaging members being cooperatively configured such that during installation the stem is inserted in the hole.

7. The tool as claimed in claim 6,
said nesting fixture defining a seat configured to snuggly receive the TPM,
said seat presenting a "U"-shaped cross-section formed by first and second overlaying walls and a cross-wall interconnecting the overlaying walls,
said first overlaying wall being biased towards the second wall, so as to apply a retaining force to the TPM during installation.

8. The tool as claimed in claim 1; and
a stop connected to the elongated member and configured to stop the pivotal motion of the wheel-engaging member towards the first end.

9. The tool as claimed in claim 1,
said grip section including a layer of manually compressible material overlaying a portion of the elongated member adjacent the first end, wherein the portion is not less than 10 cm in length.

10. The tool as claimed in claim 1, wherein said factor is not less than 10.

\* \* \* \* \*